US012066980B2

(12) United States Patent
Ganjihal et al.

(10) Patent No.: US 12,066,980 B2
(45) Date of Patent: Aug. 20, 2024

(54) FILE SYSTEM METADATA (71) Applicant: Hewlett Packard Enterprise Development LP, Houston, TX (US)

(72) Inventors: Anand Andaneppa Ganjihal, Karnataka (IN); Ankit Gupta, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 61 days.

(21) Appl. No.: 17/301,908

(22) Filed: Apr. 19, 2021

(65) Prior Publication Data
US 2021/0357366 A1 Nov. 18, 2021

(30) Foreign Application Priority Data
May 12, 2020 (IN) .............................. 202041020078

(51) Int. Cl.
*G06F 16/16* (2019.01)
*G06F 11/07* (2006.01)
*G06F 16/182* (2019.01)

(52) U.S. Cl.
CPC ........ *G06F 16/164* (2019.01); *G06F 11/0772* (2013.01); *G06F 11/0793* (2013.01); *G06F 16/184* (2019.01)

(58) Field of Classification Search
CPC .......... G06F 16/164–166; G06F 16/184–1844; G06F 11/0727; G06F 11/0772; G06F 11/0793; G06F 16/13; G06F 8/65
See application file for complete search history.

(56) References Cited

U.S. PATENT DOCUMENTS

| 9,043,280 | B1* | 5/2015 | Patwardhan | G06F 11/1435 |
| | | | | 707/640 |
| 9,146,931 | B2 | 9/2015 | Rai et al. | |
| 10,108,537 | B2 | 10/2018 | Cantrell, Jr. et al. | |
| 2006/0026567 | A1* | 2/2006 | McVoy | G06F 16/213 |
| | | | | 717/122 |
| 2006/0282471 | A1* | 12/2006 | Mark | G06F 11/08 |
| 2008/0271025 | A1* | 10/2008 | Gross | G06F 21/577 |
| | | | | 718/102 |
| 2008/0288712 | A1* | 11/2008 | Cornwell | G06F 11/0748 |
| | | | | 711/E12.008 |
| 2009/0089628 | A1 | 4/2009 | Day et al. | |

(Continued)

OTHER PUBLICATIONS

LMS and JRB, "The New Hitchhiker's Guide to Tru64's AdvFS", Mar. 9, 2006, 229 pages.

(Continued)

*Primary Examiner* — Taelor Kim
(74) *Attorney, Agent, or Firm* — Trop, Pruner & Hu, P.C.

(57) ABSTRACT

Aspects for remote analysis of file system metadata are described. In an example, a computer-readable file from a client system is received. The computer-readable file comprises file system metadata of a file system, and corresponding source location of the file system metadata on a volume of the client system. Thereafter, a target location on a target volume is identified, wherein the target location corresponds to the source location on the volume of the client system. In an example, the file system metadata is replicated onto the target location based on the computer-readable file, for analysis.

18 Claims, 6 Drawing Sheets

(56) References Cited

U.S. PATENT DOCUMENTS

| | | | | |
|---|---|---|---|---|
| 2010/0076934 A1* | 3/2010 | Pershin | ............... | G06F 11/1451 |
| | | | | 707/640 |
| 2010/0192004 A1* | 7/2010 | Bauchot | ................ | G06F 16/907 |
| | | | | 709/202 |
| 2010/0299664 A1* | 11/2010 | Taylor | ................. | G06F 16/2379 |
| | | | | 717/173 |
| 2012/0158659 A1* | 6/2012 | Marathe | ................ | G06F 16/907 |
| | | | | 707/639 |
| 2014/0297941 A1* | 10/2014 | Rajani | ................... | G06F 3/0665 |
| | | | | 711/114 |
| 2017/0060702 A1* | 3/2017 | Dave | ................... | G06F 11/2094 |
| 2018/0364920 A1* | 12/2018 | Wei | ....................... | G06F 3/0688 |
| 2020/0133502 A1* | 4/2020 | Yang | .................... | G06F 3/0613 |
| 2021/0303527 A1* | 9/2021 | Grunwald | ............ | G06F 16/1824 |

OTHER PUBLICATIONS

Wikipedia, "fsck", Dec. 22, 2019, 3 pages, retrieved from webpage: https://en.wikipedia.org/w/index.php?title=Fsck&oldid=931942079.

Yosha, N.; "Forward! with NetApp SAP ERP and Oracle NVA Design"; NetApp; Oct. 2014; pp. 1-26; NVA-0013-DESIGN; Version 1.0.

* cited by examiner

FILE SYSTEM METADATA

BACKGROUND

File systems provide a logical, computer implemented mechanism for storing and retrieving files from storage devices, such as a hard disk drive. A file system may include file system metadata which relates or corresponds to the files stored in the storage devices. The file system utilizes the metadata for implementing a variety of functions, such as storing or retrieving data from appropriate disk locations of the storage devices. In certain instances, the file system metadata may experience inconsistencies or other errors, which may impact the access of files from the file system. In such cases, the errors experienced by the file system may be assessed, and a corresponding patch may be developed for rectifying the file system error.

BRIEF DESCRIPTION OF FIGURES

Systems and/or methods, in accordance with examples of the present subject matter are now described, by way of example, and with reference to the accompanying figures, in which.

DETAILED DESCRIPTION

Data is stored in disk storages in an organized manner through file system. The file system provides a logical mechanism for creating, storing and retrieving files in response to requests from client-based applications. The file system may, in turn, be managed through a computing system which manages and controls requests from such client applications. Before the files within the file system may be used, the file system may be specifically made available for access through a process referred to as mounting. For mounting the file system, a computing system intending to access the files may obtain information to determine various attributes, such as file system structure or metadata, pertaining to the file system. Once information pertaining to such attributes are obtained, the file system is mounted.

In certain instances, the file system metadata (interchangeably referred to as metadata), may have errors owing to which the mounting of the file system may be prevented, or may cause runtime failures. Such errors may be caused due to a number of factors, for example, file system metadata inconsistencies, or corruption of the file system metadata. Under such circumstances, the faults may be resolved or fixed through software-based fixes or patches. A patch may be considered as either an executable code or a set of configuration changes for resolving the error with the file system. Such patches are developed by a debugging team by analysing the log files or metadata to identify the error or the root cause. Based on the root cause, the appropriate patch or fix may be developed by the debugging team. The patch may then be installed on client system for resolving or 'fixing' the issue which the file system may be experiencing.

However, in certain instances, if the error cannot be determined, a developed patch may be tested on the client system before it may be deployed. In such instances, the patch may be executed onto the client systems under controlled conditions. The appropriate log files (generated as a result of the execution of the patch), or the metadata (which may have been modified by the patch) may then be retrieved and provided to the debugging team for ascertaining the root cause of the issue being faced by the file system. This process may be repeated a certain number of times in order to observe the changes in the log files or the metadata, based on which the error may be determined. Such recurring testing followed by patch development increases the turnaround time for resolving the issue with the file system. This also may burden the client system with repeated testing in cases where the error could not have been determined based on the analysis of the log file or the file system metadata.

In case of any inconsistencies in the file system metadata, file system errors may be resolved by executing file system utilities for checking and correcting any file system inconsistencies. Examples of such utilities include, but are not limited to, FSCK (File System Consistency Check) and CHKDSK (Check Disk). Such file system utilities scan the disk volume for errors. On encountering an error, the file system utility may execute a series of predetermined executable functions for rectifying any error, for example, an inconsistency in the file system metadata.

Issues may also arise in cases where the file system utilities for determining and rectifying file system errors or inconsistencies itself are also experiencing issues. For example, the file system utility may be repeatedly crashing while checking for any inconsistency in the file system. Such issues may arise due to faulty code or an improper update that may have been applied onto computing system hosting the file system. In such a case, resolution of any errors with the file system may not be possible. Even in circumstances when they are functioning without error, execution of such file system utilities may take time for completion for large file system. Furthermore, in cases where the computing system hosting the file system does not have performant computational resources, the time for scanning and fixing any errors in the file system metadata may increase many folds.

Approaches for remote analysis of file system metadata are described. As per the present approaches, the patch may be developed and analysed remotely from a client system on which a file system error may be occurring. In an example, file system metadata of a file system experiencing errors may be determined. Along with the file system metadata, the corresponding locations on a disk volume of the client system (referred to as source location information) is also determined based on the file system metadata. The file system metadata along with the source location information may then be written to a computer-readable file (e.g., a binary file). In some implementations, the file system metadata (referred to as the metadata) may be written to one computer-readable file whereas source location information corresponding to the metadata may be written to another computer-readable file. Such examples also fall within the scope of the claimed subject matter without limitation. In any case, the computer-readable file includes the metadata corresponding to the file system metadata of the client system, but not the client data. In an example, the file system metadata includes file system type, file system size, file system status, free space available on the volume, and information about metadata structures within the file system metadata.

Once the metadata and corresponding source location information is written to the computer-readable file, the computer-readable file may then be transmitted to a remote computing system for analysis. On receipt of the computer-readable file, a target location on a target volume may be identified. In an example, the target location may be selected based on the source location information within the disk volume at which the metadata was stored. With the corresponding target location determined, the file system metadata_may thereafter be replicated onto the target system utilizing the metadata and the source location information written in the computer-readable file. Since the target location corresponds to the source location on the disk storage of the client system, the file system metadata replicated onto the target system matches with the file system on the client system. With the file system metadata replicated onto the target system, further analysis of the metadata may be performed for ascertaining root cause of the error, and accordingly devise a mechanism for resolving the error impacting operation of the file system.

In an example, a software patch may be developed based on analysis of the file system metadata available on the target system. The software patch thus developed may be deployed onto the target system and executed. In response to the execution of the software patch, log files and metadata may be further analyzed for ascertaining the root cause of error. Depending on the log files and the metadata, the software patch may be accordingly modified and deployed onto the target system iteratively until the error is resolved. Since the log files and corresponding metadata are available for analysis at the target system, any delays that would be caused by execution of software patch and subsequent transmission of log files, metadata changes, etc., may be reduced or eliminated. Furthermore, since the software patch is initially deployed onto the target system, any adverse impact on the client data may also be avoided.

In another example, a file system utility may be initiated and executed to process and check the file system metadata for any errors on the target system. As the file system utility executes, it may resolve the issues by changing certain portions of the file system metadata owing to which the errors may have arisen. With the error resolved, the certain portions of the file system metadata which were amended or corrected, are retrieved from the target system, and transmitted to the client system where it may be installed to modify the source file system metadata.

The above-mentioned approaches enable rectification of an error in the file system metadata by replicating it at a testing system, as opposed to carrying out any testing on the client system. This reduces any turnaround time and also prevents client data from being exposed to any preliminary testing. Furthermore, since the testing is performed at a testing system which may have better computational resources for testing as compared to the client system, the testing process may be quicker and more efficient.

The above examples are further described in conjunction with appended figures. It may be noted that the description and figures merely illustrate the principles of the present subject matter. It will thus be appreciated that various arrangements that embody the principles of the present subject matter, although not explicitly described or shown herein, may be devised from the description, and are included within its scope. Moreover, all statements herein reciting principles, aspects, and examples of the present subject matter, as well as specific examples thereof, are intended to encompass equivalents thereof. In the figures, the left-most digit(s) of a reference number identifies the figure in which the reference number first appears. The same numbers are used throughout the figures to reference like features and components.

Figure 1:
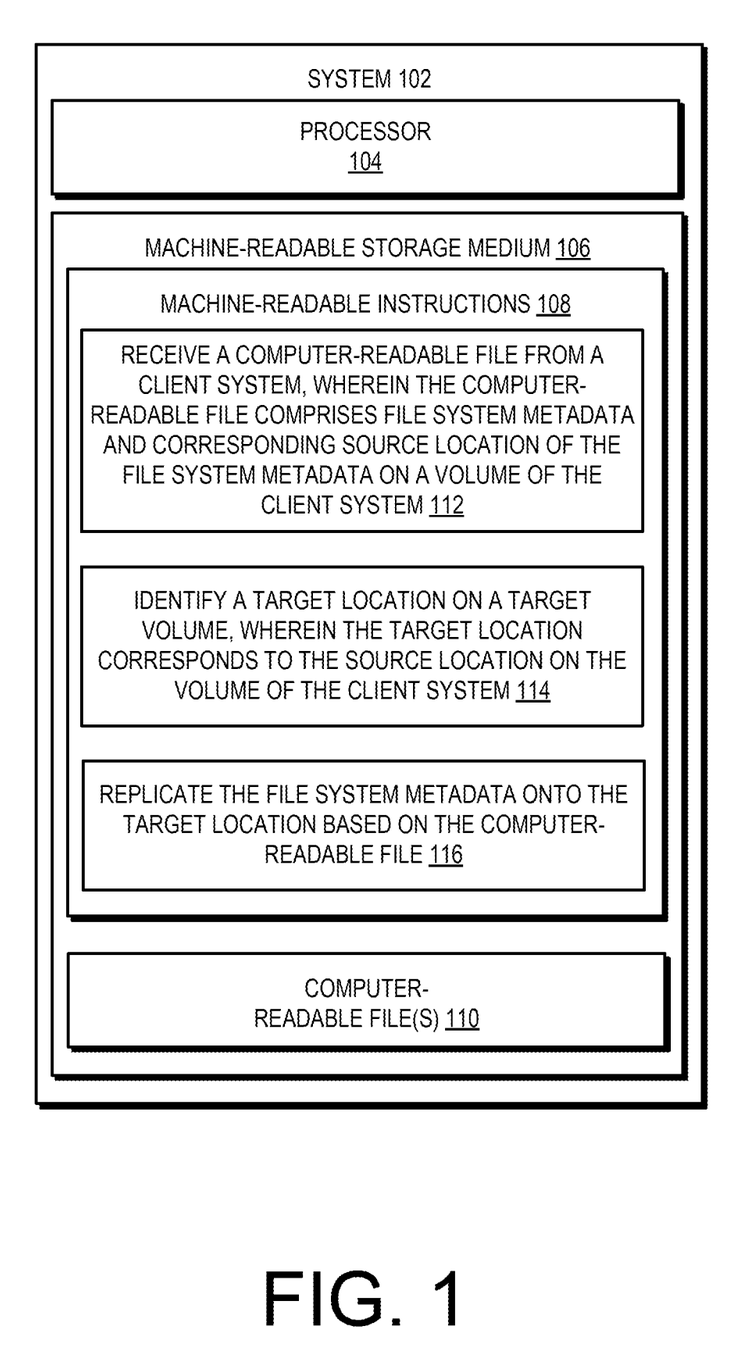
FIG. 1 illustrates a system for replicating file system metadata, in accordance with an example of the present subject matter.

FIG. 1 illustrates an example testing system 102 for analysing file system metadata of a file system, in accordance with an example of the present subject matter. The testing system 102 (hereinafter referred to as system 102) includes a processor 104, and a machine-readable storage medium 106 which is coupled to, and accessible by, the processor 104. The system 102 may be implemented in any computing system, such as a storage array, server, desktop or a laptop computing device, a distributed computing system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include any non-transitory computer-readable medium including, for example, volatile memory such as RAM, or non-volatile memory such as EPROM, flash memory, and the like.

The processor 104 may fetch and execute machine-readable instructions 108 (referred to as instructions 108) to analyse file system metadata corresponding to file system of a remote client computing system (not shown in FIG. 1). As will be explained in the present description, the file system metadata and corresponding information pertaining to the file system metadata is transmitted from a remote client system and retrieved by the system 102. Thereafter, the file system metadata retrieved from the client computing system may be analysed to determine the root cause of the error which may be impacting operation of the file system in the client computing system. In an example, the file system metadata from the client computing system may be written to a computer-readable file 110. The computer-readable file 110 thus obtained includes the file system metadata and information indicating location of the file system metadata within a disk storage volume of the client computing system. The computer-readable file 110 forms the basis on which the file system metadata is replicated onto a target location of a target volume. In an example, the computer-readable file 110 may be a binary file.

In operation, the processor 104 may fetch and execute instructions 108 to analyse file system metadata of a file system, as is described in the following sections. The file system metadata may include a variety of information such as, file system type, file system size, file system status, free space available on the volume, and information about metadata structures within the file system metadata. In one example, the instructions 108 may further include instructions 112 to receive a computer-readable file 110 from a remote client system. The client system may further include a disk storage having a file system for providing storing and maintaining client data. The file system itself may have corresponding metadata which defines a number of attributes, such as name, size, and location, of the file stored in a source location on a disk volume of the client system. In an example, the client system may write the file system metadata and information pertaining to location on a volume of the client system, where the file system metadata (referred to as metadata) is stored. The client system may retrieve the metadata and the source location information and write the same to a computer-readable file 110. The computer-readable file 110 thus generated is transmitted to the system 102 for analysis.

On receiving the computer-readable file 110, the instructions 114 may then be executed to determine a target location within a target volume which is accessible by the system 102. The target volume may be available within the system 102 or may be at a disk storage which is remotely accessible by the system 102. In an example, the target location is such that it corresponds to the source location at which the metadata was stored within the client system. The instructions 114 may further result in identification of the target location based on the source location information available within the computer-readable file 110.

With the target location now determined, the instructions 116 may be executed to replicate the file system metadata of the client system onto the target location of the target volume, for analysis. In an example, the metadata may be replicated based on the metadata present in the computer-readable file 110. Thereafter, the replicated metadata may be further analysed for determining a root cause of the error impacting operation of the file system. In an example, a software patch may be developed to resolve the error with the file system. In another example, a file system utility may be initiated executed on the target location for analysing and checking the file system metadata. An error encountered may be resolved by the file system utility. In an example, the corrected metadata may be transmitted and deployed at the client system. It may be noted that above approaches are provided in conjunction with few examples. However, the scope of the present subject matter is not be restricted to only said examples. The other examples and additional aspects are further described in conjunction with the remaining figures.

Figure 2:
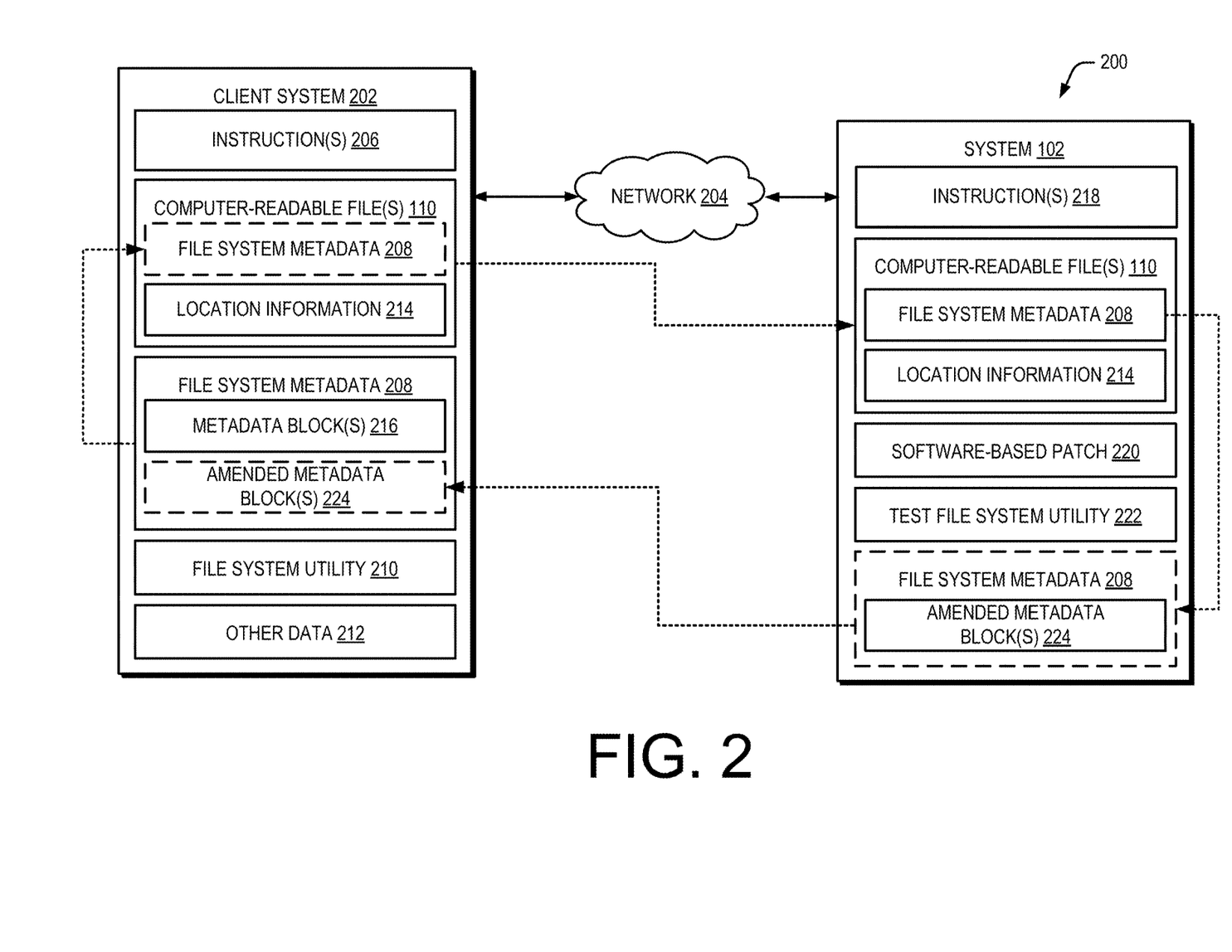
FIG. 2 illustrates a network environment for replicating file system metadata, in accordance with an example of the present subject matter.

FIG. 2 illustrates a network environment 200 for remotely analysing file system metadata of a client system, in accordance with an example of the present subject matter. The network environment 200 includes a client system 202 utilizing a file system (not depicted in FIG. 2). The client system 202 may be in communication with system 102, which in turn analyses and rectifies any errors in the file system of the client system 202. In an example, the client system 202 is in communication with the system 102 through a network 204.

The network 204 may be a private network or a public network and may be implemented as a wired network, a wireless network, or a combination of a wired and wireless network. The network 204 may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The client system 202 may further include instructions 206 for performing functions in relation to analysis of the file system as explained further. The client system 202 may further store file system metadata 208, which is data related to the file system of the client system 202, and other data 212. In an example, the file system metadata 208 may include file system type, file system size, file system status, and free space available on the volume. The client system 202 may further include a file system utility 210 which when initiated, may rectify any error, for example, an inconsistency in the file system metadata 208. The other data 212 may include data which is either utilized or generated by the client system 202 during the analysis of the file system metadata 208.

In operation, the instructions 206 are fetched from a memory of the client system 202 and executed by a processor of the client system 202. In the context of the present subject matter, the instructions 206 may be executed in instances when the file system of the client system 202 fails to mount the file system. Such errors may arise due to inconsistencies in the file system metadata 208. In an example, the instructions 206 may be executed to obtain the file system metadata 208 and information pertaining to the source location in the disk volume, where the file system metadata 208 is stored. Once the file system metadata 208 and its corresponding source location is obtained, the execution of the instructions 206 may result in generation of computer-readable file 110. The computer-readable file 110 thus generated includes the file system metadata 208 and location information 214.

In an example, the file system metadata 208 may be in the form of metadata block(s) 216. The metadata block(s) 216 may be read upon execution of the instructions 206 to obtain the metadata contained therein. The metadata thus obtained may then be written to the computer-readable file 110. In an example, the computer-readable file 110 may be a binary file. Although FIG. 2 depicts a single computer-readable file 110 to include the file system metadata 208 as well as the location information 214, the file system metadata 208 and the location information 214 may be captured and written across multiple such computer-readable files 110 without deviating from the scope of the present subject matter.

Returning to the present example, the computer-readable file 110 once obtained may be subsequently transmitted to the system 102 for analysis and for determining the root cause of the errors which may be impacting operation of the file system of the client system 202. The system 102 may be any remotely located computing device being utilized for analysing the file system metadata 208. Once the computer-readable file 110 is obtained by the system 102, the instructions 218 may be executed. The instructions 218 may further process the computer-readable file 110 in the system 102. In an example, the instructions 218 may identify a corresponding target location within a target volume (not shown in FIG. 2). In an example, the target volume may either be available on a disk storage present within the system 102 or may be remotely accessible by the system 102 over a network (such as the network 204). The target volume thus determined is such that it corresponds to or is similar to the source location in the client system 202 where the file system metadata 208 was stored. With the target location thus determined, the instructions 218 may be further executed to write file system metadata 208 onto the target location. As described previously, the target location in the target volume (which is accessible by the system 102) corresponds to the source location in the client system 202 in which the file system metadata 208 is stored.

Once the file system metadata 208 is written onto the target location, a replica of the file system metadata 208 is now available to the system 102. The file system metadata 208 available at the system 102 may then be analyzed for determining the root cause of errors. In an example, file system may be activated based on the file system metadata 208 within the system 102. Based upon the activation, log files thus generated may be further analyzed to ascertain the issue with the file system. In another example, a software-based patch 220 for resolving an error with the file system metadata 208 may be developed and installed at the system 102. Once installed, the software-based patch 220 may be executed. Any consequent changes caused due to the installation and the subsequent execution of the software-based patch 220 may be identified. If the error continues to persist, the software-based patch 220 may be suitably modified and installed. If the error stands resolved through the software-based patch 220, the software-based patch 220 may be transmitted to the client system 202 for installation, and for resolving the error at the client system 202.

In certain cases, the file system metadata 208 may have inconsistencies which, in turn, may be resulting in errors while activating or mounting the file system. In an example, the system 102 may further include a test file system utility 222 (referred to as the test utility 222 for sake of brevity). Once the file system metadata 208 is written to the target location and is accessible by the system 102, the test utility 222 may be executed. Examples of the test utility 222 include, but are not limited to, FSCK (File System Consistency Check) and CHKDSK (Check Disk). Upon execution, the test utility 222 may scan the file system metadata 208 for inconsistencies. On detecting any inconsistencies, the test utility 222 may appropriately modify the metadata block(s) 216 to rectify any inconsistencies with the file system metadata 208 to result in amended metadata block(s) 224. The amended metadata block(s) 224 may then be identified and retrieved. Once retrieved, the amended metadata block(s) 224 may be transmitted to the client system 202. The client system 202 on receiving the amended metadata block(s) 224 may initiate the instructions 206, which on execution may identify metadata block(s) 216 corresponding to the amended metadata block(s) 224. Once identified, the instructions 206 may be executed to further replace the metadata block(s) 216 within the client system 202.

As also described previously, in certain instances, the file system utility 210 of the client system 202 may have become corrupted, resulting in errors in mounting or activating the file system within the client system 202. In such instances, the instructions 206 may be executed to derive information pertaining to the file system utility 210. For example, the instructions 206 when executed may result in determining a version identifier, installation parameters, or information pertaining to any updates installed for the file system utility 210. The instructions 206 may be executed to further transmit the derived information of the file system utility 210 to the system 102. In an example, the derived information may be transmitted at any stage subsequent to the transmission of the computer-readable file 110 to the system 102. Based on the received derived information, the instructions 218 in the system 102 may be executed to determine a corresponding test utility 222. In an example, the test utility 222 may be identified from a repository of file system utilities. The test utility 222 may then be installed within the system 102 and initiated. If the test utility 222 resolves the error, it may be concluded that perhaps the file system utility 210 in the client system 202 may be corrupted, which in turn was preventing the mounting of the file system onto the client system 202.

As explained through the present examples, the file system metadata 208 may be replicated onto a target location which is accessible by the system 102. To such an end, the file system metadata 208 is initially written to a computer-readable file 110 (e.g., a binary file). The computer-readable file 110 is then transmitted to the system 102, which then replicates the file system metadata 208 onto a target location, such that the file system metadata 208 is accessible (and therefore capable of being analyzed), without interfering with the file system on the client system 202.

Figure 3:
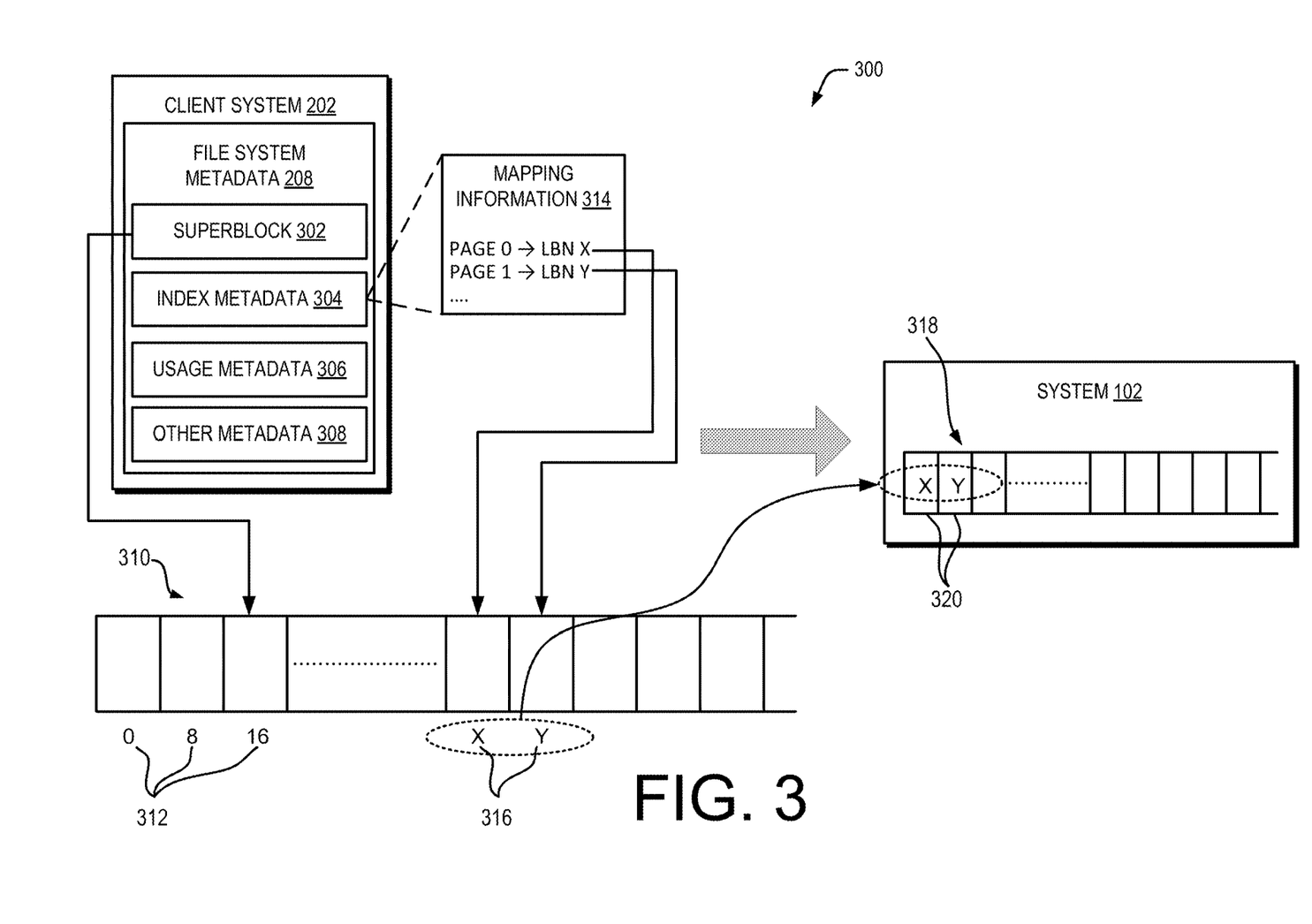
FIG. 3 illustrates the manner of replicating file system metadata within a network environment, in accordance with an example of the present subject matter.

The manner in which file system metadata 208 is determined and written to the computer-readable file 110 is further explained in conjunction with FIG. 3. FIG. 3 illustrates a computing environment 300. The environment 300 includes the client system 202. As described in conjunction with FIG. 2, the client system 202 is in communication with the system 102 over a network 204. The client system 202 may further include a file system which is utilized for storing and for providing access to data. A file system, in one example, may be considered as a structural representation which defines various information pertaining to underlying data. Such information provides the basis for performing a variety of file related functions, such as access, modification, or creation.

In the context of the present example, the client system 202 may store the file system metadata 208. The file system metadata 208 may further include metadata, namely, a superblock 302, index metadata 304, usage metadata 306, and other metadata 308. In an example, a superblock 302 may be considered as a data structure defining information pertaining to the file system metadata 208. For example, the superblock 302 may include the index metadata 304 and the usage metadata 306. Since the superblock 302 includes information (i.e., metadata) pertaining index metadata 304, usage metadata 306, and other metadata 308 (which again is metadata), it may be said that the superblock 302 is metadata pertaining to the metadata of the file system.

Returning to the other elements of the file system metadata 208, the index metadata 304 may be a data structure which defines a file system object, such as a file or a directory. Within the data structure, the index metadata 304 may specify attributes, features, or other information about such file objects. In addition, the index metadata 304 may also specify locations on disk volume where such metadata may be stored. In an example, the index metadata 304 may be an inode (also referred to as an index node) in the context of Unix-based file systems. The usage metadata 306 may specify the extent of usage of the disk volume by the file system metadata 208. For example, the usage metadata 306 may specify the amount for free-disk volume that may be available. In an example, the usage metadata 306 may be a Storage Bit Map (SBM) in the context of Unix-based file systems.

The different data structures of the file system metadata 208 may occupy distinct locations within the volume of a disk storage of the client system 202. In an example, the file system metadata 208 may be stored in source volume 310, which may further include a plurality of blocks 312. Each page may be considered as a singular unit in which data is stored. In the present example, each of the blocks 312 have been depicted as having a page size of 8 kilobytes (8K). In an example, the location of each of the blocks 312 may be based on a linear address space with each page location being specified by an indicator which is a multiple of the page size. For example, the first page within the source volume 310 may be identifiable with a block number 0, the second page being identifiable with a block number 8, and so on and so forth. In the example as illustrated, the superblock 302 may begin at block number 16. In an example, the block number may be a Logical Block Number (LBN) based on a logical block addressing scheme in the context of Unix-based systems. It may be noted that the present example is only indicative and is not to be construed as a limitation. Any other example or numbering scheme may be employed for identifying the location of pertinent metadata page.

Continuing further, the other elements of the file system metadata 208 may provide further information pertaining to the file system metadata 208. The file system metadata 208 may span across multiple pages of the source volume 310. As described previously, the index metadata 304 may specify the metadata along with the location of such metadata. In an example, the index metadata 304 may specify such information as mapping information 314, which provides a mapping between the page and the location which stores the contents (i.e., the metadata) of the page. With reference to the example as illustrated in FIG. 3, the mapping information 314 of the index metadata 304 provides a mapping between the various pages in which the index metadata 304 is stored, with the locations in the source volume 310. For example, 'page 0' of the index metadata 304 (which is different from the first page of the source volume 310 indicated by block number 0) is mapped onto block number X. This implies that the contents of 'page 0' would be available at block number X within the source volume 310. In a similar manner, 'page 1' would be available at block number Y. Both the block numbers X and Y are collectively depicted as blocks 316. In a similar manner, the index metadata 304 may a data structure for the metadata pertaining to the file system of the client system 202.

As described previously, the instructions 206 within the client system 202 may execute to determine the file system metadata 208 and corresponding source location of the file system metadata 208, and accordingly, write the same to the computer-readable file 110. In an example, the instructions 206 when executed may scan through the different elements of the file system metadata 208. For example, the contents of the computer-readable file 110 may be generated by reading the respective metadata pages from the different locations on the source volume 310. The relevant metadata from the different metadata pages is retrieved and written to the computer-readable file 110 as file system metadata 208. The information pertaining to the different locations from which the corresponding metadata was fetched is written to the computer-readable file 110 as location information 214.

The computer-readable file 110 is transmitted to the system 102 wherein a target volume 318 and a corresponding target location 320 may be determined. The target volume 318 and the target location 320 may correspond to the volume and the locations of the blocks of the file system metadata 208 in the client system 202. In such a case, the target locations 320 may correspond to the locations (e.g., the LBN X, Y storing 'page 0' and 'page 1' of the index metadata 304) in the source volume 310. As a result, the target locations 320 will be identifiable by the LBN X, Y for the 'page 0' and 'page 1' of the index metadata 304, when replicated onto the target volume 318. In an example, the target location 320 may be determined based on the mapping information available within the computer-readable file 110. For example, the computer-readable file 110 provides both the file system metadata 208 along with the location information 214 for the corresponding metadata. These metadata may include location information pertaining to the different elements of the file system metadata 208 (e.g., the superblock 302, the index metadata 304, or the usage metadata 306). Based on the mapping between different types of metadata (provided in file system metadata 208) and their respective source location (provided in the location information 214), the system 102 is to identify the target location 320. Once the target location 320 is determined, the file system metadata 208 is written at the respective target location 320 utilizing the file system metadata 208 within the computer-readable file 110. It may be noted that although FIG. 3 depicts target location 320 to be included within the system 102, the target location 320 may be in a disk storage which is remotely accessible by the system 102, without deviating from the scope of the present subject matter.

Figure 4:
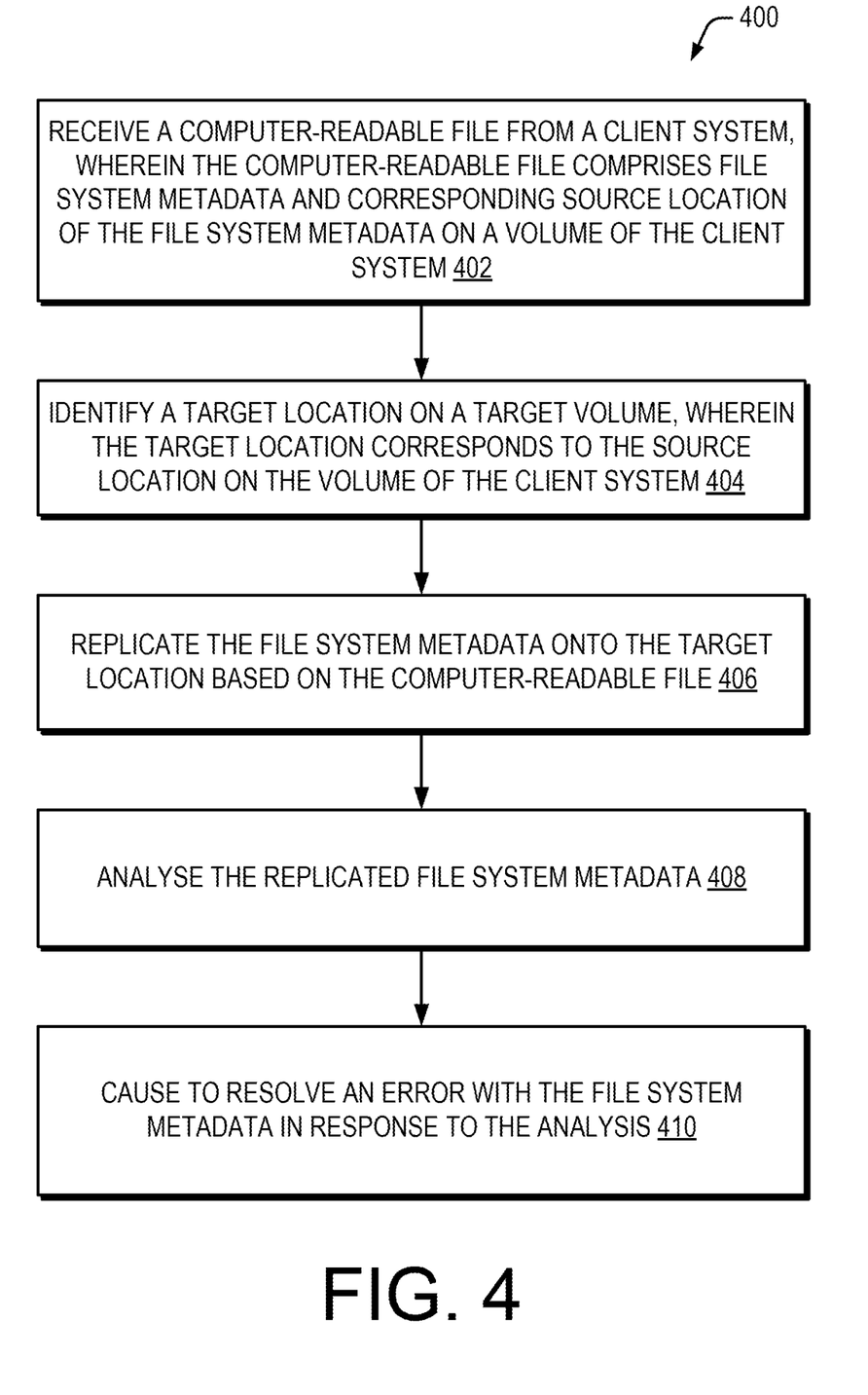
FIG. 4 illustrates a method for replicating file system metadata, in accordance with an example of the present subject matter.
Figure 5:
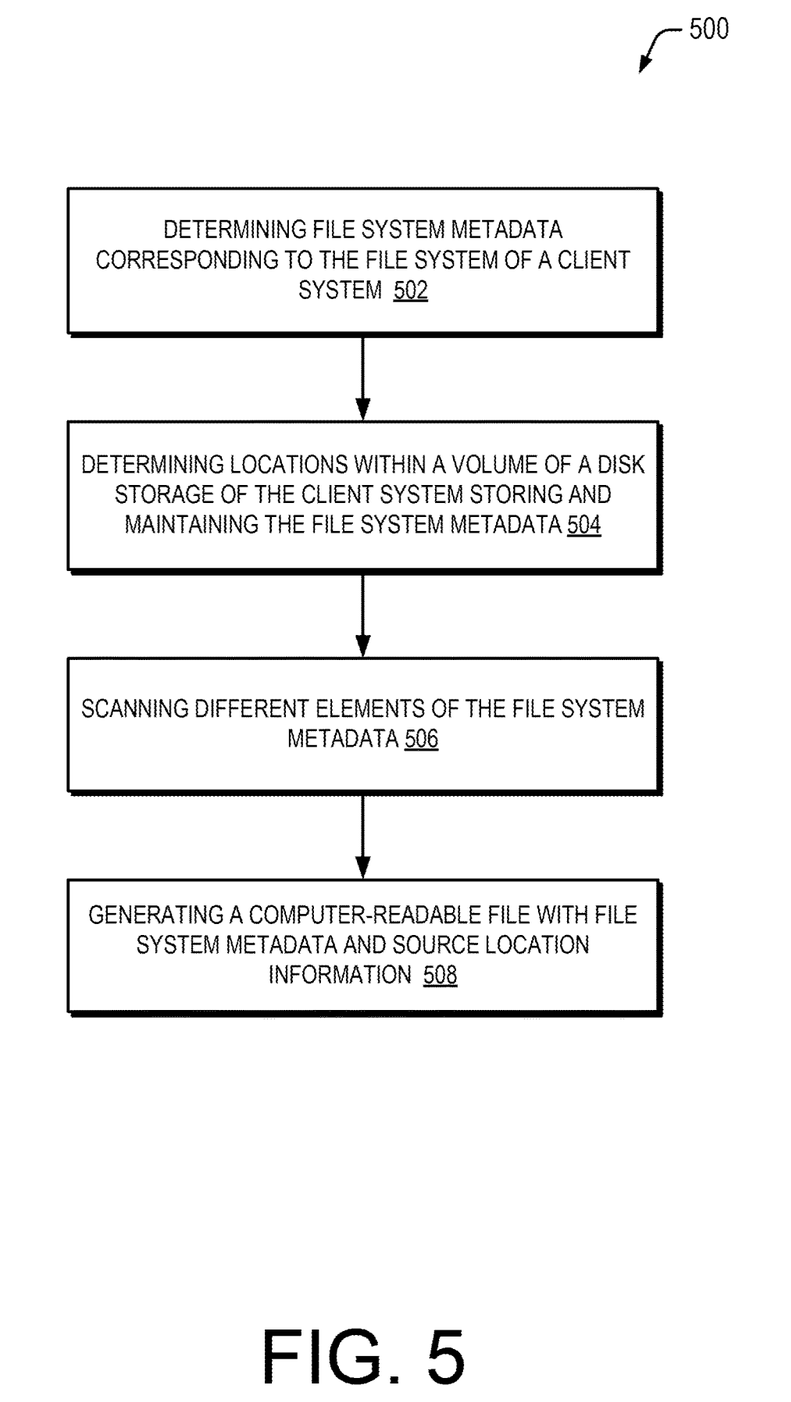
FIG. 5 illustrates a method for replicating file system metadata, in accordance with another example of the present subject matter.
Figure 6:
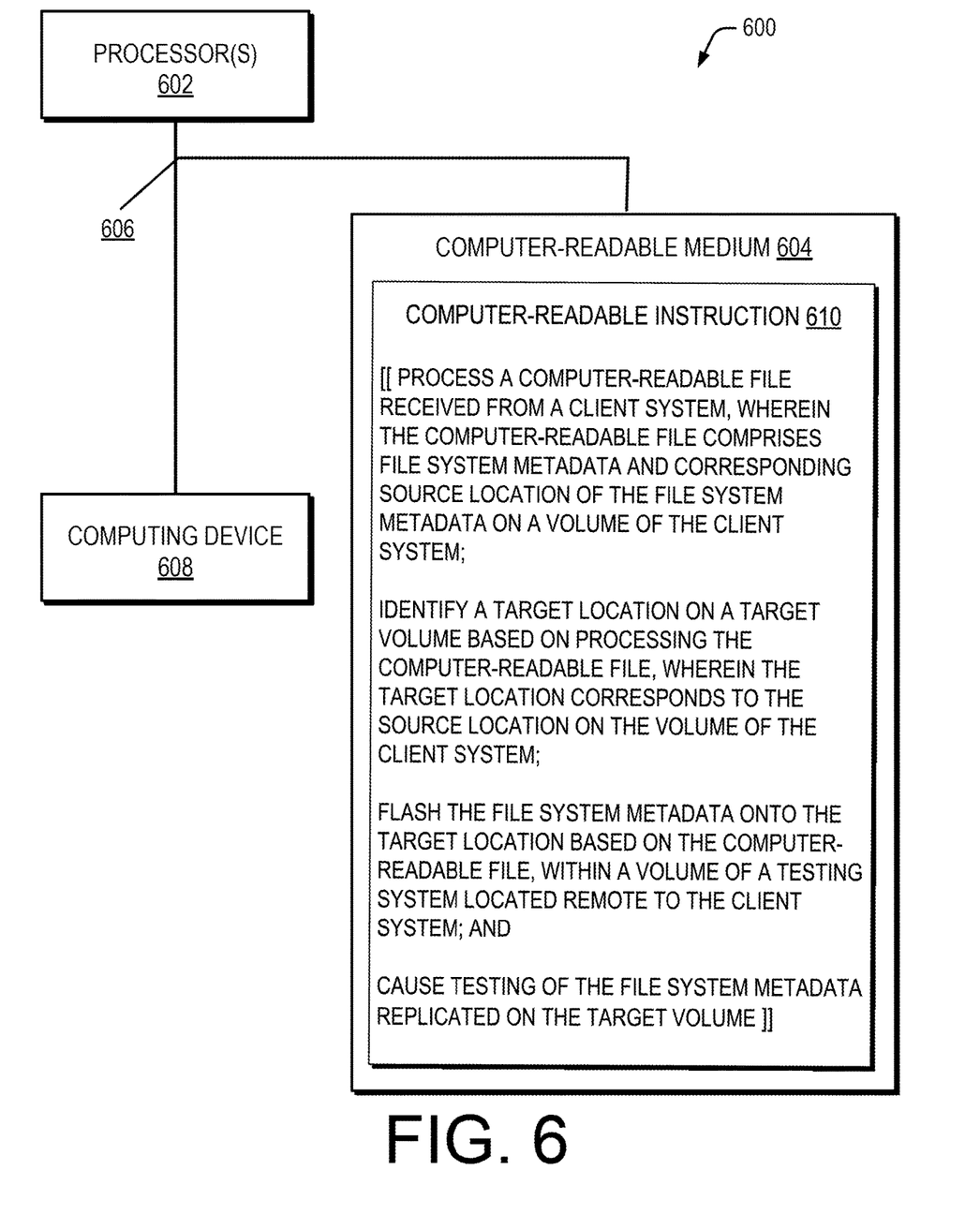
FIG. 6 illustrates a system environment implementing a non-transitory computer readable medium for replicating file system metadata, according to an example of the present subject matter

FIGS. 4-6 illustrate example methods 400, 500, and 600 for remotely analysing metadata of a file system within a client computing system, in accordance with example implementations of the present subject matter. The order in which the above-mentioned methods are described is not intended to be construed as a limitation, and some of the described method blocks may be combined in a different order to implement the methods, or alternative methods.

Furthermore, the above-mentioned methods may be implemented in any suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by the one of systems 102, and client system 202 in the network environment 200. In an implementation, the methods may be performed under an "as a service" delivery model, where the system 102, operated by a provider, receives the file system metadata and performs testing and/or remediated for the client system 202, operated by a customer, on-demand or based on a service subscription. Herein, some examples are also intended to cover non-transitory computer readable medium, for example, digital data storage media, which are computer readable and encode computer-executable instructions, where said instructions perform some or all of the steps of the above-mentioned methods.

In an example, the method 400 may be implemented by testing system 102 which remotely analyzes the file system metadata 208 of a client computing system, such as the client system 202. At block 402, a computer-readable file is received from a client system. The computer-readable file comprises file system metadata and their corresponding source location on a volume of the client system. In an example, the client system 202 may generate the computer-readable file 110 by scanning the file system metadata 208 to identify metadata block(s) 216 and the corresponding location, within the disk storage, where the file system metadata 208 is stored. The metadata is written as file system metadata 208 to the computer-readable file 110, with the information pertaining to the source location being written as the location information 214. Once generated, the client system 202 may transmit the computer-readable file 110 to the system 102 for analysis of the file system metadata 208.

At block 404, a target location on a target volume is identified. The target location is such that it corresponds to the source location of the file system metadata on the volume of the client system. For example, the system 102 determines a target location within a target volume which may be accessible by the system 102. The target volume may be available within the system 102 or may be at a disk storage which is remotely accessible by the system 102.

At block 406, the file system metadata may be replicated onto the target location based on the computer-readable file received from the client system. For example, the system 102 may obtain the computer-readable file 110. With the target location now determined, the system 102 may replicate the file system metadata of the client system onto the target location of target volume, for analysis. To this end, the system 102 may obtain information pertaining to the file system metadata 208 from the computer-readable file 110, and accordingly write the file system metadata 208 to the target location, such as the target volume 318.

At block 408, the replicated file system metadata on the target location may be further analyzed. For example, the file system metadata 208 available at the system 102 may then be analyzed for determining the root cause of errors. The analysis may involve analyzing a plurality of log files which may have been generated by activating the file system based on the file system metadata 208. Based on the log files thus generated, errors which may be impacting the file system may be determined. In some implementations, block 408 includes causing a test utility to analyse the replicated file system metadata at system 102.

At block 410, an error which may be impacting the file system, may be resolved. For example, in cases where the file system metadata 208 may have inconsistencies, a test utility 222 (e.g., FSCK tool, or a CHKDSK tool) may be installed on the system 102. Upon execution, the test utility 222 may scan the file system metadata 208 for inconsistencies. On detecting any inconsistencies, the test utility 222 may appropriately modify the metadata block(s) 216 to rectify any inconsistencies with the file system metadata 208 to result in amended metadata block(s) 224. If the error stands resolved, the amended metadata block(s) 224 may then be subsequently transmitted to the client system 202, where they may replace metadata block(s) 216. In another instance, a software-based patch 220 may be developed and installed at the system 102. The software-based patch 220 may be executed or caused to be executed. If the software-based patch 220 is determined to have resolved the error, the software-based patch 220 may be provided to the client system 202, where it may be installed.

FIG. 5 illustrates a method 500 for generating a computer-readable file, such as the computer-readable file 110. The method 500 may be implemented in the client system 202 in which the file system may be experiencing issues. At block 502, the file system metadata corresponding to the file system of a client system may be determined. In an example, the metadata may be available as file system metadata 208. The file system metadata 208 may further include metadata, such as superblock 302, index metadata 304, and usage metadata 306. As described previously, the superblock 302 may include the index metadata 304 and the usage metadata 306. The index metadata 304 may specify attributes, features, or other information (which is nothing but metadata) about such file objects. In addition, the index metadata 304 may also specify locations on disk volume where such metadata may be stored. In an example, the index metadata 304 may be an inode (also referred to as an index node) in the context of Unix-based file systems. The usage metadata 306 on the other hand specifies the extent of usage of the disk volume by the file system metadata 208.

At block 504, locations within a volume of a disk storage of the client system storing and maintaining the file system metadata may be determined. For example, the file system metadata 208 may be stored in source volume 310, which may further include a plurality of blocks 312, with a location in the source volume 310 storing the contents of such blocks 312. In an example, the location of the content of blocks 312 the block number may be a Logical Block Number (LBN) based on a logical block addressing scheme in the context of Unix-based systems.

At block 506, different elements of the file system metadata may be scanned. For example, the client system 202 may scan through the different elements of the file system metadata 208 and reading the respective metadata pages from the different locations on the source volume 310.

At block 508, a computer-readable file with file system metadata and source location information may be generated. For example, the client system 202 may retrieve the metadata from the different metadata pages (e.g., stored in any of the LBNs) and is written to the computer-readable file 110 as file system metadata 208. The information pertaining to the different locations (e.g., the LBN X, Y, etc.) from which the corresponding metadata was fetched is written to the computer-readable file 110 as location information 214. In an example, the computer-readable file 110 is a binary file.

FIG. 6 illustrates a computing environment 600 implementing a non-transitory computer readable medium for remotely analyzing a file system of a client computing system, such as the client system 202. In an example, the computing environment 600 includes processor(s) 602 communicatively coupled to a non-transitory computer readable medium 604 through a communication link 606. In an example implementation, the computing environment 600 may be for example, the network environment 200. In an example, the processor(s) 602 may have one or more processing resources for fetching and executing computer-readable instructions from the non-transitory computer readable medium 604. The processor(s) 602 and the non-transitory computer readable medium 604 may be implemented, for example, in system 102 (as has been described in conjunction with the preceding figures).

The non-transitory computer readable medium 604 may be, for example, an internal memory device or an external memory device. In an example implementation, the communication link 606 may be a network communication link, such as of network 204. The processor(s) 602 and the non-transitory computer readable medium 604 may also be communicatively coupled to a computing device 608 over the network. The computing device 608 may be implemented, for example, as a client system 202, the file system of which may be experiencing issues.

In an example implementation, the non-transitory computer readable medium 604 includes a set of computer readable instructions 610 which may be accessed by the processor(s) 602 through the communication link 606 and subsequently executed for analyzing the file system of the client system 202. Referring to FIG. 6, in an example, the non-transitory computer readable medium 604 includes instructions 610 that cause the processor(s) 602 to process a computer-readable file, such as the computer-readable file 110, received from a client system, such as the client system 202. The computer-readable file 110 in turn may include file system metadata (such as file system metadata 208), along with its corresponding source location (such as location information 214) of the file system metadata on a volume of the client system.

Once the computer-readable file 110 is received, the instructions 610 when executed may identify a target location, such as target location 320, on a target volume, such as the target volume 318. In an example, the target location 320 corresponds to the source location on the volume, such as the target volume 318 of the client system 202. Once the target volume 318 and the target locations 320 are identified, the instructions 610 may cause the file system metadata 208 to be flashed onto the target location 320 based on the computer-readable file. For flashing, the file system metadata 208 may be written to specific target location 320 within the target volume 318. Thereafter, the instructions 610 may be executed to cause testing of the file system metadata 208 replicated onto the target volume 318 within the system 102. In an example, the testing of the file system may be based on patches, such as a software-based patch 220. The software-based patch 220 may be installed initially on the system 102 to determine whether the software-based patch 220 resolves the error with the replicated file system at the system 102. If the error is resolved, the software-based patch 220 may be deployed on the client system 202 for resolving the errors with the file system. In another example, the instructions 610 may be executed to further execute test utility 222 within the system 102. In such instances, the execution of the test utility 222 may result in modification of metadata block(s) 216 to resolve errors to provide amended metadata block(s) 224. The amended metadata block(s) 224 may thereafter be transmitted to the client system 202, to replace corresponding metadata block(s) 216 which were resulting in file system inconsistencies.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A test system comprising:
a processor; and
a non-transitory machine-readable storage medium comprising instructions executable on the processor to:
receive, from a client system that is separate from the test system, file system metadata of a file system in the client system, and information of a source location of the file system metadata in a volume of the client system, wherein the information of the source location received at the test system from the client system indicates source block numbers identifying blocks containing the file system metadata in the volume of the client system;
determine a target location in a target volume accessible by the test system, wherein the target location is determined based on the information of the source location received from the client system, and the determining of the target location in the target volume comprises using the source block numbers indicated by the information of the source location as target volume block numbers of blocks in the target volume at which the file system metadata is replicated in the target volume;
replicate the file system metadata to the blocks in the target volume referenced by the target volume block numbers;
initiate a test file system utility at the test system to detect an error in the replicated file system metadata at the blocks referenced by the target volume block numbers;
analyze, by the test file system utility, the replicated file system metadata at the blocks referenced by the target volume block numbers to identify the error in the replicated file system metadata impacting operation of a file system described by the replicated file system metadata;
determine whether a portion of the replicated file system metadata has been amended by the test file system utility to rectify the error; and
send, from the test system to the client system, the portion of the replicated file system metadata that has been amended, to replace a corresponding portion of the file system metadata at the client system that fixes an error in the file system metadata at the source location in the volume of the client system.

2. The test system of claim 1, wherein the instructions are executable on the processor to:
mount, in the test system, a file system based on the replicated file system metadata,
wherein the error in the replicated file system metadata impacts operation of the file system mounted in the test system based on the replicated file system metadata.

3. The test system of claim 1, wherein the information of the source location of the file system metadata received at the test system from the client system comprises mapping information that maps pages of the file system metadata to the source block numbers, and wherein the determining of the target location in the target volume is based on the mapping information received at the test system from the client system.

4. The test system of claim 1, wherein the file system metadata and the information of the source location of the file system metadata are received from the client system in a computer-readable file.

5. The test system of claim 1, wherein the file system metadata comprises a file system type, a file system size, a file system status, free space available on the volume of the client system, and information about metadata structures within the file system metadata.

6. The test system of claim 1, wherein the instructions are executable on the processor to:
receive a software patch corresponding to the error in the replicated file system metadata;
execute the software patch; and
ascertain whether the execution of the software patch resolves the error in the replicated file system metadata.

7. The test system of claim 6, wherein the instructions are executable on the processor to:
in response to ascertaining the error in the replicated file system metadata has been resolved, cause transmission of the software patch to the client system.

8. A method comprising:
receiving, at a test system from a client system that is separate from the test system, file system metadata of a file system in the client system and information of a source location of the file system metadata in a volume of the client system, wherein the information of the source location received at the test system from the client system indicates source block numbers identifying blocks containing the file system metadata in the volume of the client system;
determining, by the test system, a target location in a target volume of the test system, wherein the target location is determined based on the information of the source location received from the client system, and the determining of the target location in the target volume comprises using the source block numbers indicated by the information of the source location as target volume block numbers of blocks in the target volume at which the file system metadata is replicated in the target volume;

replicating, by the test system, the file system metadata to the blocks in the target volume referenced by the target volume block numbers;

initiating a test file system utility at the test system to detect an error in the replicated file system metadata at the blocks referenced by the target volume block numbers;

analyzing, by the test file system utility, the replicated file system metadata at the blocks referenced by the target volume block numbers to identify the error in the replicated file system metadata impacting operation of a file system described by the replicated file system metadata;

determining, by the test system, whether a portion of the replicated file system metadata has been amended by the test file system utility to rectify the error; and sending, from the test system to the client system, the portion of the replicated file system metadata that has been amended, and replacing a corresponding portion of the file system metadata at the client system that fixes an error in the file system metadata at the source location in the volume of the client system.

9. The method of claim 8, further comprising:
mounting, in the test system, a file system based on the replicated file system metadata, wherein the error in the replicated file system metadata impacts operation of the file system mounted in the test system based on the replicated file system metadata.

10. The method of claim 8, comprising selecting, by the test system, the test file system utility based on a version identifier of a file system utility installed on the client system.

11. The method of claim 8, comprising:
receiving, at the test system, information of a client file system utility at the client system;
executing, at the test system, the test file system utility in the test system; and
based on the execution of the test file system utility, determining, by the test system, whether the client file system utility is corrupted.

12. A non-transitory computer-readable medium comprising instructions that upon execution cause a test system to:
receive, at the test system from a client system that is separate from the test system, file system metadata of a file system in the client system and information of a source location of the file system metadata in a volume of the client system, wherein the information of the source location received at the test system from the client system indicates source block numbers identifying blocks containing the file system metadata in the volume of the client system;
determine a target location in a target volume of the test system, wherein the target location is based on the information of the source location received from the client system, and the determining of the target location in the target volume comprises using the source block numbers indicated by the information of the source location as target volume block numbers of blocks in the target volume at which the file system metadata is replicated in the target volume;

replicate the file system metadata to the blocks in the target volume referenced by the target volume block numbers;

initiate a test file system utility at the test system to detect an error in the replicated file system metadata at the blocks referenced by the target volume block numbers;

analyze, by the test file system utility, the replicated file system metadata at the blocks referenced by the target volume block numbers to identify the error in the replicated file system metadata impacting operation of a file system described by the replicated file system metadata;

determine whether a portion of the replicated file system metadata has been amended by the test file system utility to rectify the error; and send, from the test system to the client system, the portion of the replicated file system metadata that has been amended, to replace a corresponding portion of the file system metadata at the client system that fixes an error in the file system metadata at the source location in the volume of the client system.

13. The non-transitory computer-readable medium of claim 12, wherein the instructions upon execution cause the test system to:
receive information of a client file system utility at the client system;
select the test file system utility based on the information of the client file system utility;
execute the test file system utility in the test system; and
based on the execution of the test file system utility, determine, at the test system, whether the client file system utility is corrupted.

14. The non-transitory computer-readable medium of claim 12, wherein the instructions upon execution cause the test system to:
mount, in the test system, a file system based on the replicated file system metadata,
wherein the error in the replicated file system metadata impacts operation of the file system mounted in the test system based on the replicated file system metadata.

15. The test system of claim 1, wherein the instructions are executable on the processor to:
mount, in the test system, a file system based on the replicated file system metadata; and
produce a log file based on the mounting of the file system in the test system, the log file to indicate an issue with the file system in the test system.

16. The non-transitory computer-readable medium of claim 12, wherein the information of the source location of the file system metadata received at the test system from the client system comprises mapping information that maps pages of the file system metadata to the source block numbers, and wherein the determining of the target location in the target volume is based on the mapping information received at the test system from the client system.

17. The method of claim 8, wherein the file system metadata comprises a file system type, a file system size, a file system status, free space available on the volume of the client system, and information about metadata structures within the file system metadata.

18. The non-transitory computer-readable medium of claim 12, wherein the file system metadata comprises a file system type, a file system size, a file system status, free space available on the volume of the client system, and information about metadata structures within the file system metadata.

\* \* \* \* \*